(12) United States Patent
Ghabour

(10) Patent No.: US 11,528,210 B2
(45) Date of Patent: *Dec. 13, 2022

(54) METHOD AND APPARATUS FOR COMMUNICATION OF DATA BETWEEN NDT/NDI INSTRUMENT AND AN EXTERNAL NETWORK

(71) Applicant: Olympus Scientific Solutions Americas Corp., Waltham, MA (US)

(72) Inventor: Ehab Ghabour, Northborough, MA (US)

(73) Assignee: Olympus Scientific Solutions Americas Corp., Waltham, MA (US)

(*) Notice: Subject to any disclaimer, the term of this patent is extended or adjusted under 35 U.S.C. 154(b) by 55 days.

This patent is subject to a terminal disclaimer.

(21) Appl. No.: 17/249,737

(22) Filed: Mar. 11, 2021

(65) Prior Publication Data

US 2021/0266248 A1    Aug. 26, 2021

Related U.S. Application Data

(63) Continuation of application No. 16/371,108, filed on Mar. 31, 2019, now Pat. No. 10,979,336.

(Continued)

(51) Int. Cl.
*H04L 12/26* (2006.01)
*H04W 88/16* (2009.01)
(Continued)

(52) U.S. Cl.
CPC .......... *H04L 43/50* (2013.01); *H04L 49/20* (2013.01); *H04W 24/06* (2013.01); *H04W 88/16* (2013.01); *H04W 88/18* (2013.01)

(58) Field of Classification Search
CPC ......... H04L 43/50; H04L 43/55; H04L 49/20; H04W 88/16; H04W 88/18; H04W 88/06;
(Continued)

(56) References Cited

U.S. PATENT DOCUMENTS

| 7,627,439 B1 | 12/2009 | Kessler et al. |
| 10,979,336 B2 | 4/2021 | Ghabour et al. |

(Continued)

FOREIGN PATENT DOCUMENTS

| CN | 113728228 A | 11/2021 |
| GB | 2544108 A | 5/2017 |

(Continued)

OTHER PUBLICATIONS

"U.S. Appl. No. 16/371,108, Examiner Interview Summary dated Aug. 14, 2020", 3 pgs.

(Continued)

*Primary Examiner* — Candal Elpenord
(74) *Attorney, Agent, or Firm* — Schwegman Lundberg & Woessner, P.A.

(57) ABSTRACT

A non-destructive testing and inspection (NDT/NDI) system having a communication gateway removably secured to an existing NDT/NDI instrument by a clip-on clasp. The gateway comprises a processor, a network interface, a housing configured to be removably secured onto the NDT/NDI instrument, an interconnect configured to be communicatively coupled with and to carry data to or from the NDT/NDI instrument, and memory storing computer readable code which, when executed on the processor, causes the processor to communicate data with an external network over the network interface. The data includes inspection data which can be any one of the following: ultrasonic scans of A, B, C or S, eddy current strip charts.

20 Claims, 8 Drawing Sheets

Related U.S. Application Data

(60) Provisional application No. 62/823,081, filed on Mar. 25, 2019.

(51) Int. Cl.
  *H04L 12/931* (2013.01)
  *H04W 24/06* (2009.01)
  *H04W 88/18* (2009.01)
  *H04L 43/50* (2022.01)
  *H04L 49/20* (2022.01)

(58) Field of Classification Search
  CPC ..... H04W 24/06; H04W 24/04; H04W 24/10; H04W 24/02
  USPC .................................................. 370/241, 252
  See application file for complete search history.

(56) References Cited

U.S. PATENT DOCUMENTS

| | | |
|---|---|---|
| 2009/0273342 A1 | 11/2009 | Drummy |
| 2011/0018688 A1 | 1/2011 | Hanada et al. |
| 2012/0222485 A1 | 9/2012 | Stickel |
| 2014/0004548 A1 | 1/2014 | Gordon et al. |
| 2014/0188649 A1* | 7/2014 | Messinger .......... H04L 41/0886 705/26.1 |
| 2014/0189851 A1 | 7/2014 | Domke et al. |
| 2014/0375309 A1 | 12/2014 | Graebner |
| 2015/0053025 A1 | 2/2015 | Coombs et al. |
| 2016/0131606 A1 | 5/2016 | Weigl |
| 2016/0370798 A1 | 12/2016 | Georgeson et al. |
| 2017/0030863 A1 | 2/2017 | Holmes et al. |
| 2017/0160243 A1 | 6/2017 | Zhang et al. |
| 2018/0164258 A1 | 6/2018 | Feydo et al. |
| 2018/0328890 A1 | 11/2018 | Lopez |
| 2020/0313997 A1 | 10/2020 | Ghabour et al. |

FOREIGN PATENT DOCUMENTS

| | | |
|---|---|---|
| WO | WO-2008012535 A2 | 1/2008 |
| WO | WO-2018129530 A2 | 7/2018 |
| WO | WO-2020198382 A1 | 10/2020 |

OTHER PUBLICATIONS

"U.S. Appl. No. 16/371,108, Final Office Action dated Oct. 23, 2020", 22 pgs.

"U.S. Appl. No. 16/371,108, Non Final Office Action dated Jun. 10, 2020", 15 pgs.

"U.S. Appl. No. 16/371,108, Notice of Allowance dated Dec. 24, 2020", 10 pgs.

"U.S. Appl. No. 16/371,108, Response filed Sep. 8, 2020 to Non Final Office Action dated Jun. 10, 2020", 9 pgs.

"U.S. Appl. No. 16/371,108, Response filed Dec. 8, 2020 to Final Office Action dated Oct. 23, 2020", 8 pgs.

"International Application Serial No. PCT/US2020/024752, International Search Report dated Jun. 16, 2020", 7 pgs.

"International Application Serial No. PCT/US2020/024752, Written Opinion dated Jun. 16, 2020", 6 pgs.

Gul, Samet, et al., "Smartphone Controlled Ultrasonic Nondestructive Testing System Design", International Conference on Engineering Technologies, Retrieved from the Internet: <URL:https://www.researchgate.net/publication/322492444_Smartphone_controlled_ultrasonic_nondestructive_testing_system_design> [retrieved on Jun. 12, 2019], (Sep. 7, 2017), 1-4.

"European Application Serial No. 20720258.1, Response Filed Apr. 7, 2022 to Communication Pursuant to Rules 161(2) and 162 EPC dated Nov. 5, 2021", 18 pgs.

"International Application Serial No. PCT/US2020/024752, International Preliminary Report on Patentability dated Oct. 7, 2021", 8 pgs.

* cited by examiner

METHOD AND APPARATUS FOR COMMUNICATION OF DATA BETWEEN NDT/NDI INSTRUMENT AND AN EXTERNAL NETWORK

CROSS-REFERENCE TO RELATED APPLICATIONS

This application is a Continuation of U.S. patent application Ser. No. 16/371,108 filed Mar. 31, 2019 entitled METHOD AND APPARATUS FOR COMMUNICATION OF DATA BETWEEN NDT/NDI INSTRUMENT AND AN EXTERNAL NETWORK, which claims the benefit and priority of U.S. Provisional patent application Ser. No. 62/823,081 filed Mar. 25, 2019 entitled METHOD AND APPARATUS FOR COMMUNICATION OF DATA BETWEEN NDT/NDI INSTRUMENT AND AN EXTERNAL NETWORK, the entire disclosures of which are incorporated herein by reference.

FIELD OF THE INVENTION

Example embodiments of the present disclosure relate to non-destructive testing and inspection (NDT/NDI), more specifically to a communication gateway for use with an NDT/NDI instrument to communicate with an external network.

BACKGROUND OF THE INVENTION

Non-destructive testing and inspection (NDT/NDI) instruments can be utilized to detect internal structural flaws in an object or material by transmitting inspection energy pulses to a target object and analyzing echo signals responded from the target object. A typical NDT/NDI instrument may be an ultrasonic instrument which uses an ultrasonic transducer being placed against the object to be tested and allowing bursts of ultrasonic energy send to the object. A typical testing result of the ultrasonic instrument involves an A-scan which is a plot of amplitude representing the response of the ultrasonic pulse versus time. Another typical NDT/NDT instrument may be an eddy current instrument which induces eddy current on the surface of testing object. A typical testing result of the eddy current instrument involves a strip chart indicating voltage change on an impedance plane.

SUMMARY OF THE INVENTION

In the example embodiments of the present disclosure, it is provided a non-destructive inspection and testing (NDT/NDI) system comprising an NDT/NDI instrument configured for conducting NDT/NDI measurement, a communication gateway configured to be secured to the NDT/NDI instrument and to communicate data with an external network, and a data connector configured to carry the data between the communication gateway and the NDT/NDI instrument. In example embodiments, the communicating gateway comprises a processor, a network interface, memory storing computer readable code which, when executed on the processor, causes the processor to communicate data with the external network over the network interface, and an interconnect configured to be communicatively coupled with and to carry data to or from the NDT/NDI instrument.

BRIEF DESCRIPTION OF THE DRAWINGS

Other objects, features and advantages will occur to those skilled in the art from the following description of preferred embodiments and the accompanying drawings.

DETAILED DESCRIPTION OF THE INVENTION

Figure 1:
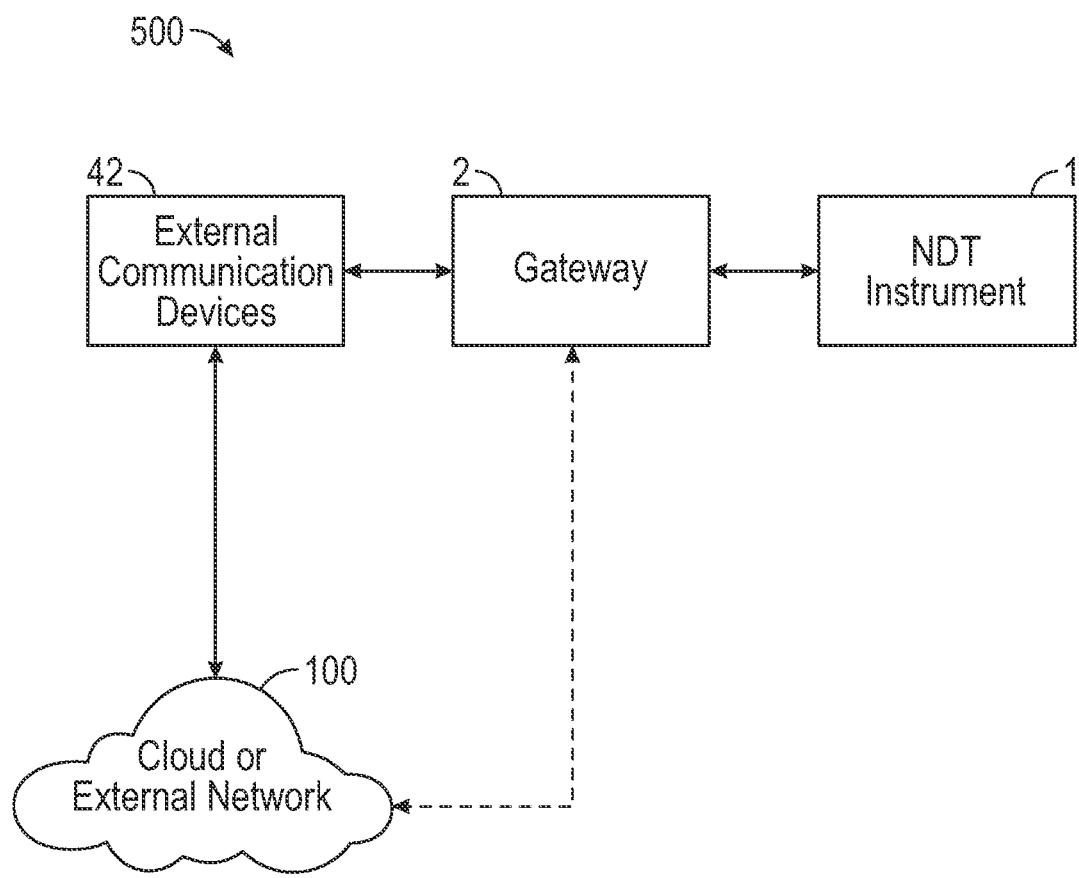
FIG. 1 is a block diagram depicting an NDT/NDI system having a communication gateway for communicating with an external network according to an example embodiment of the present disclosure.

Aside from the preferred embodiment or embodiments disclosed below, this invention is capable of other embodiments and of being practiced or being carried out in various ways. Thus, it is to be understood that the invention is not limited in its application to the details of construction and the arrangements of components and steps set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Typical NDT/NDI instruments do not have built-in telecommunication capabilities to allow the instrument to be connected remotely to the Internet or the Cloud. They lack the ability to leverage new technological advancements because they were designed as stand-alone instruments. Often these existing instruments are fit with a serial data port to USB converter, which further connects to a Bluetooth® dongle to be then connected to the Cloud. This is extremely inconvenient. As nowadays it is often crucial to be able to transfer inspection data from the field to the Cloud, or to download files of calibration, specification or control to the existing instruments, there is an unmet need for this long-sought solution.

One of the novel aspects of the present disclosure is to provide the communication gateway which is removably secured to any existing NDT/NDI instrument, and to enable network connections via choices of connection modes, i.e., wireless LAN, Bluetooth® or cellular wireless communication, and, to enable transfer of NDT/NDI data, such as A-scans or strip charts with an external network or the Cloud.

FIG. 1 is a block diagram of an example embodiment of an NDT/NDI system 500 having a communication gateway 2 for providing communications with the Cloud 100. According to FIG. 1, NDT/NDI system 500 comprises an NDT/NDI instrument 1 configured for conducting NDT/NDI measurement and a communication gateway 2 configured to communicate data with the Cloud or external network 100. External communication devices 42, such as a Bluetooth® communicator or wireless LAN access points, can be further connected with the Cloud 100. Communication gateway 2 can also alternatively be connected to the Cloud 100 directly via a cellular wireless device (connection shown in dashed line).

Figure 2:
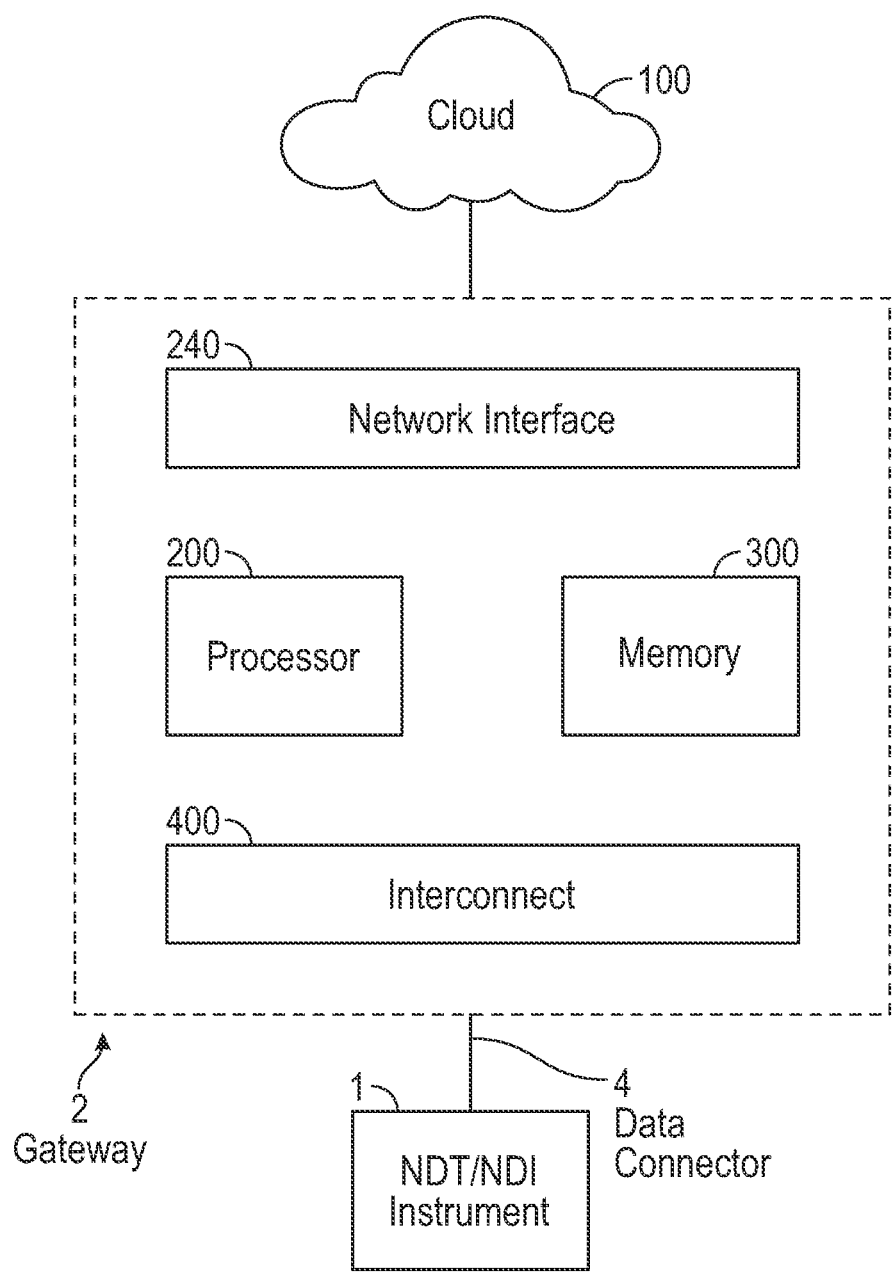
FIG. 2 is a block diagram depicting the structure of the communication gateway according to an example embodiment of the present disclosure.

Referring to FIG. 2, communication gateway 2 comprises a processor 200, a network interface 240, and memory 300 storing computer readable code which, when executed on processor 200, causes processor 200 to communicate the data with the Cloud 100 over network interface 240. It can be appreciated that processor 200 can be of any type of logic circuitry.

Gateway 2 also comprises an interconnect 400. A data connector 4 is used to carry the data between the communication gateway 2 and NDT/NDI instrument 1 via interconnect 400. Data connector 4 in one exemplary embodiment is a serial data cable because this type of cable is often compatible to existing NDT/NDI instruments. It should be appreciated that any type of data cables can be configured to transfer data between communication gateway 2 and NDT/NDI instrument 1. In addition, data connector 4 also preferably provides the power source from instrument 1 to communication gateway 2.

Figure 3:
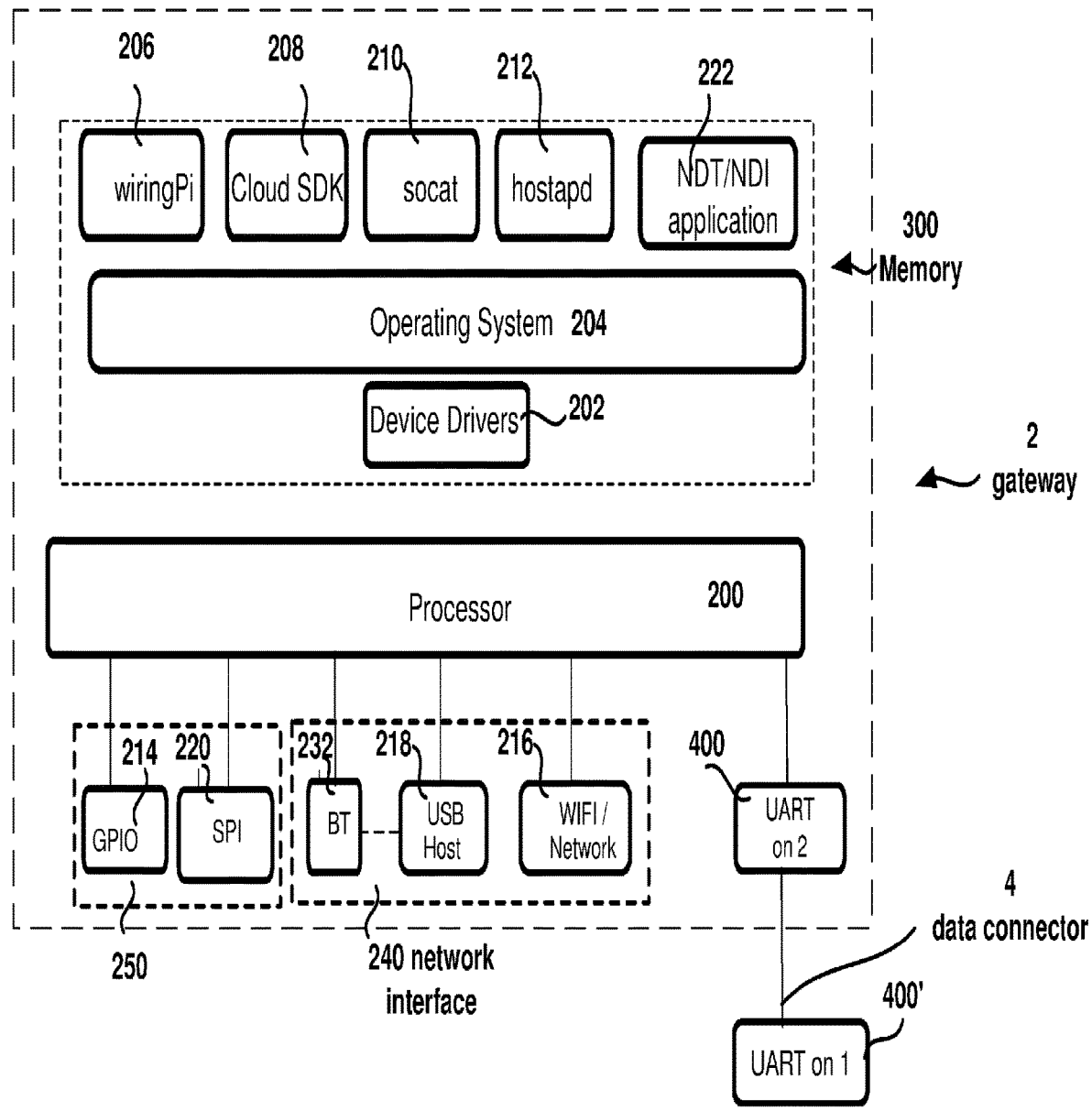
FIG. 3 is a block diagram depicting more detailed structure of the communication gateway according to an example embodiment of the present disclosure.

FIG. 3 is a block diagram providing more detailed description of processor 200, memory 300 and interconnect 400.

Referring to FIG. 3 and continuing to refer to FIG. 2, data connector 4 in this exemplary embodiment is a serial data cable connecting communication gateway 2 and instrument 1 via a pair of (a first and a second) UART interfaces 400 and 400'. A data connector 4 is communicatively coupled respectively by the first UART interface 400 and the second UART interface 400' on the instrument 1. The UART interface is only an exemplary embodiment of interconnect 400. Other type of data connecting interconnect is also within the scope of the present disclosure. In existing practice, UART interface (the second UART interface) 400' on instrument 1 also is enabled to perform other existing functions of instrument 1 such as connecting to a PC or another similar type of instrument.

Still referring to FIG. 3, processor 200 is preferably coupled with or includes a user interface console 250 which includes a general purpose input and output (GPIO) connector 214 to facilitate user interface functions such as relaying operator commands via buttons 16, 18 (in FIG. 6) of communication gateway 2. User interface console 250 may also include a Serial Peripheral Interface (SPI) 26 to facilitate user interface functions via display 12 of communication gateway 2 shown in FIG. 6.

Referring to FIG. 3, network interface 240 in this exemplary embodiment includes any of the following: a Universal Serial Bus (USB) connector 218, a Bluetooth® connector 232, and a wireless Local Area Network (LAN) transceiver 216. Alternatively, a cellular wireless transceiver (not shown) or any other types of connector or transceiver can be included in the network interface 240.

Still referring to FIG. 3, memory 300 in this exemplary embodiment comprises executable instructions which, when executed by processor 200, cause processor 200 to perform the methods of example embodiments of the present invention, such as establishing the data connection with NDT/NDI instrument 1, receiving data from the NDT/NDI instrument 1, establishing a communication channel with external network 100, and sending the data to external network 100.

In the exemplary embodiment shown in FIG. 3, the executable instructions in memory 300 comprise modules of computer readable codes such as a cloud SDK 208 which is configured to enable communication between communication gateway 2 with the Cloud 100. A "socat" (a name for "multipurpose relay" in Linux) module 210 is preferably used to facilitate a bridge communication between the communication gateway 2 via its Bluetooth® interface 232 or a Bluetooth dongle connected via USB 218 with the external communication device 42. A "hostapd" module 212 is used to configure communication gateway 2 to function as a wireless LAN or Wi-Fi® access point to, for example, allow an operator to connect and external device to the communication gateway 2. Memory 300 also includes other device drivers 202 and other modules of executable instructions such as module "wiringPi" 206. Memory 300 further includes a module of NDT/NDI specific application computer code 222 to facilitate operations related to NDT/NDI instrument 1. And an operating system 204 such as a Linux operation system in memory 300 supports the execution of all of the above modules of computer readable codes by processor 200.

Figure 4A:
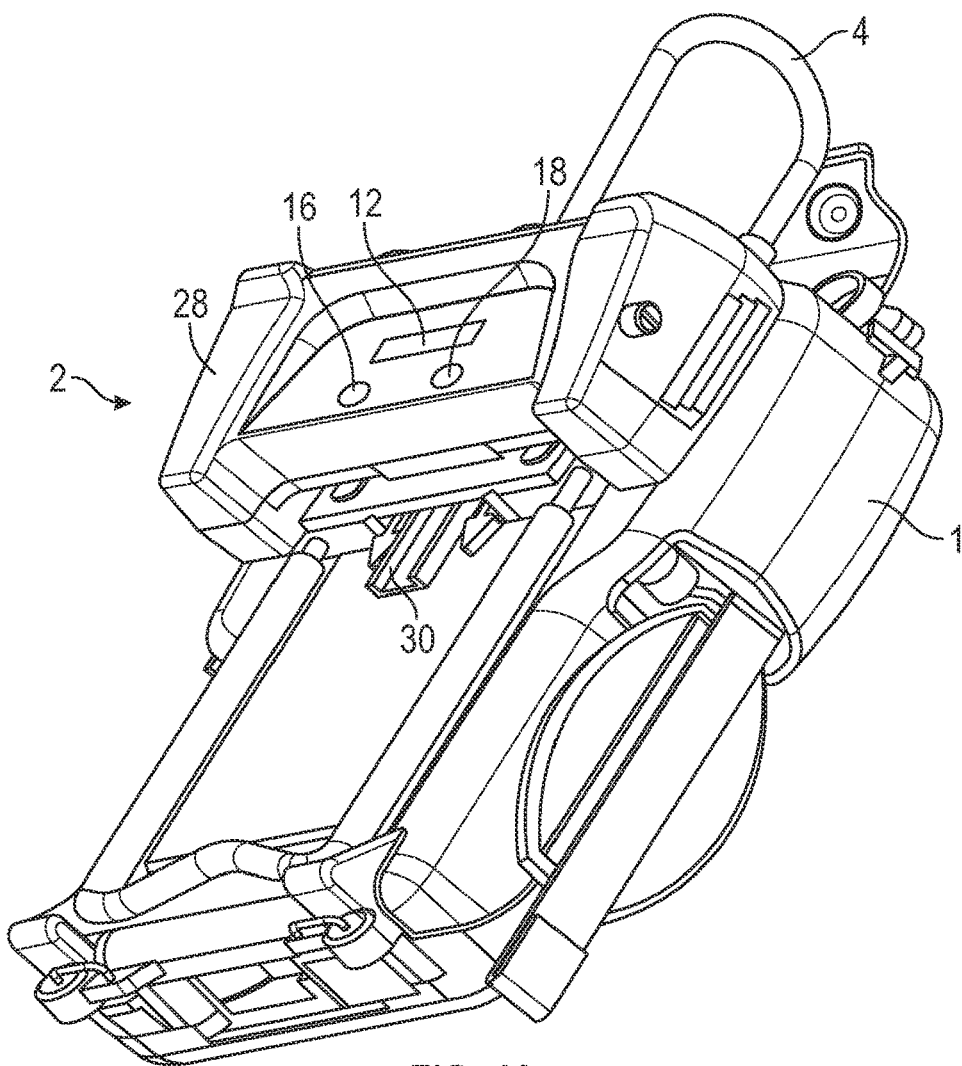
FIG. 4A is an isometric view of the exemplary communication gateway being removably secured to the NDT/NDI instrument according to the present disclosure.
Figure 4B:
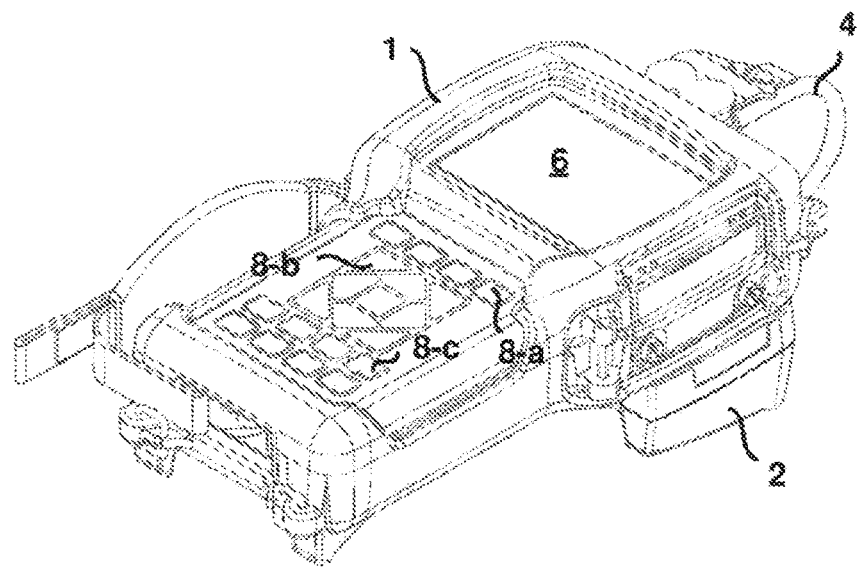
FIG. 4B is another isometric view of the exemplary communication gateway being removably secured to the NDT/NDI instrument according to the present disclosure.

Referring to FIGS. 4A and 4B, the clip-on communication gateway 2 attached to the exemplary ultrasonic NDT/NDI instrument 1 is depicted. Instrument 1 can be any type of instrument used in the non-destructive instrumentation/testing industry (NDT/NDI), such as an ultrasonic flaw detector, an ultrasonic thickness gauge or a corrosion measurement instrument. These instruments, particularly those already designed or manufactured, might not be readily equipped with the abilities to communicate with the external network 100, such as via wireless LAN, Bluetooth®, etc. It is often an existing practice to transfer data with the external network 100 by using a USB or serial port connector enabled stand-alone external communication medium, such as a wireless LAN dongle or a PC.

As shown in FIGS. 4A and 4B, according to the present disclosure, instrument 1 is equipped with a removably secured communication gateway 2. In the preferred embodiment, communication gateway 2 includes housing 28 and clasp 30. Communication gateway 2 is attached to instrument 1 with a clip-on clasp 30 (shown in FIG. 4A, and more details in FIGS. 6 and 7). In this exemplary embodiment, instrument 1 and communication gateway 2 are preferably connected by using a serial port connector cable 4 because this type of connector is traditionally used in the NDT/NDI industry. Those skilled in the art should appreciate that any type of data connectors can be used to connect instrument 1 and communication gateway 2, the embodiment of which is within the scope of the present disclosure.

Referring to FIG. 4A, communication gateway 2 is preferably configured to include gateway user interface such as gateway display 12 and buttons 16, 18, independent from an instrument display 6 shown in FIG. 4B. Instrument display 6 in its normal NDI/NDI measurement operations displays messages and waveform that used by the existing NDT/NDI instrument 1. Gateway display 12 is configured to display messages related to the operation of communication gateway 2, such as the communications with the external networks 100 or the Cloud (shown in FIG. 1).

Gateway user interface also includes, for example, two buttons 16 and 18 nested on housing 28. Button 16 is preferably configured so that when it is pressed and held for a predetermined amount of time, for example, it turns on or off communication gateway 2. Button 18 is preferable configured to select what kind of messages to be shown related to what types of communication channel is selected.

Those skilled in the art should appreciated that the embodiments of gateway user interface can take alternative types or forms. For example, it can be a touch screen, a virtual button operated via buttons. The operation of gateway 2 can also be facilitated from the instrument user interface. For example, the operation of selecting a communication channel, or a type of network interface as explained above in association with FIGS. 2 and 3, can be performed by an operator entering a command via instrument display 6 or instrument button 8-a or 8-c shown in FIG. 4B.

Figure 5A:
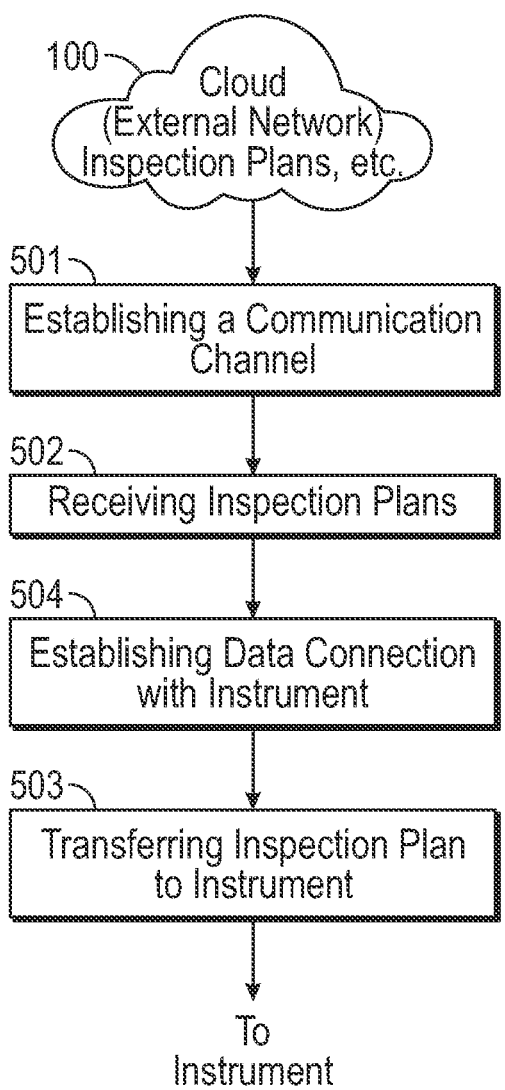
FIG. 5A is a flow diagram depicting the exemplary flow of steps that the communication gateway uses to receive information from the Cloud (the external network) and forward the information to the NDT/NDI instrument.
Figure 5B:
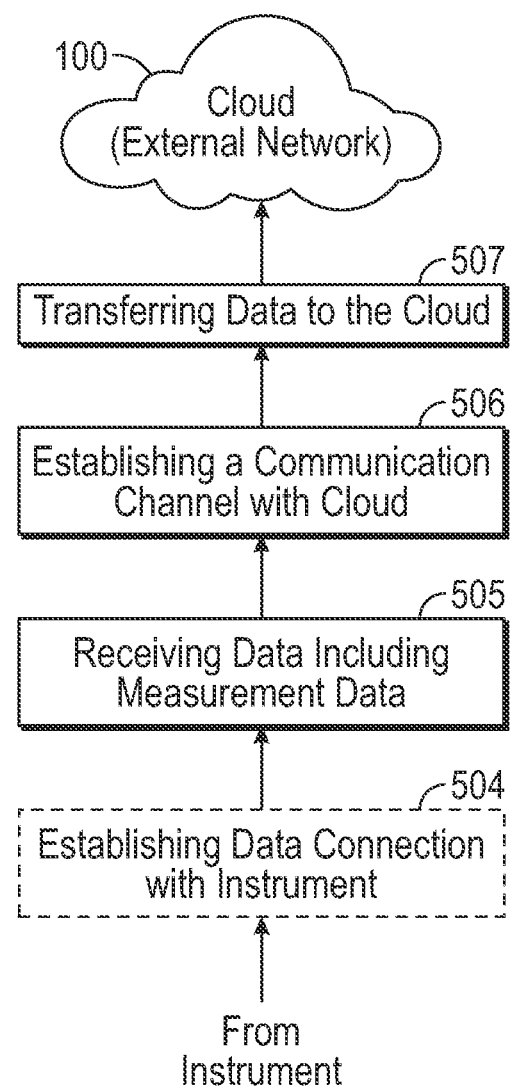
FIG. 5B is a flow diagram depicting the exemplary flow of steps that the communication gateway uses to receive information from the NDT/NDI instrument and forward the information to the Cloud (the external network).

FIGS. 5A and 5B are flow diagrams showing a method of communicating data between NDT/NDI instrument 1 and the external network 100 by using communication gateway 2. In the field of NDT/NDI, operation documents such as inspection plans related to the location, inspection points and the nature of the inspection can be prepared at the external network 100. As seen in FIG. 5A, in a downlink operation, the embodiment method devised by communication gateway 2 comprises a step 501 for establishing a communication channel between communication gateway 2 and external network 100, a step 502 for receiving inspection plans from the external network, a step 504 for establishing a data connection with instrument 1, and a step 503 for transferring the inspection plans to instrument 1. It should be noted that if the data connection with instrument 1 is already established, step 504 can be omitted.

As seen in FIG. 5B, in an uplink operation, the embodiment method devised by communication gateway also comprises a step 504 for establishing a data connection between the instrument and the communication gateway, a step 505 for receiving data from instrument 2, a step 506 for establishing a communication channel between communication gateway 2 and external network 100, and a step 507 for transferring the data from the gateway to the external network 100. It should be noted that if the data connection with instrument 1 is already established in the downlink operation, step 504 can be omitted here. It should be noted that the sequence of these steps can be alternated to fit for the operation, which is within the scope of the present disclosure. The data in step 505 and 507 includes measurement data, such as ultrasonic A-scans or eddy current strip charts as explained in association with FIGS. 1 and 2.

Known to NDT/NDI industry, instrument 1, such as an ultrasonic instrument, at times of operation, receives response signals in response to ultrasonic pulses emitted to a test object (not shown). The response signals are converted to digital signals which form testing results including A-scans—plots of digital response signal amplitude as a function of time. For Eddy Current applications of instrument 1, the response signals would include strip charts on an impedance plane. It should be noted that the generation of A-scans or strip charts is commonly known. One of the novel aspects of the present disclosure deals with how to conveniently transfer A-scans or strip chart from existing instruments to the Cloud 100, enabling the usage of various means of telecommunication protocols without incurring much redesign cost.

It should be appreciated that other ultrasonic data representation, such as B-scan, C-scan and S-scan can also be transmitted to communication gateway 2, the embodiment of which is within the scope of the present disclosure. It should be further appreciated that A-scan information can be provided by instrument 1 to communication gateway 2 either in the form of data series or waveform, the embodiment of which is within the scope of the present disclosure.

Figure 6:
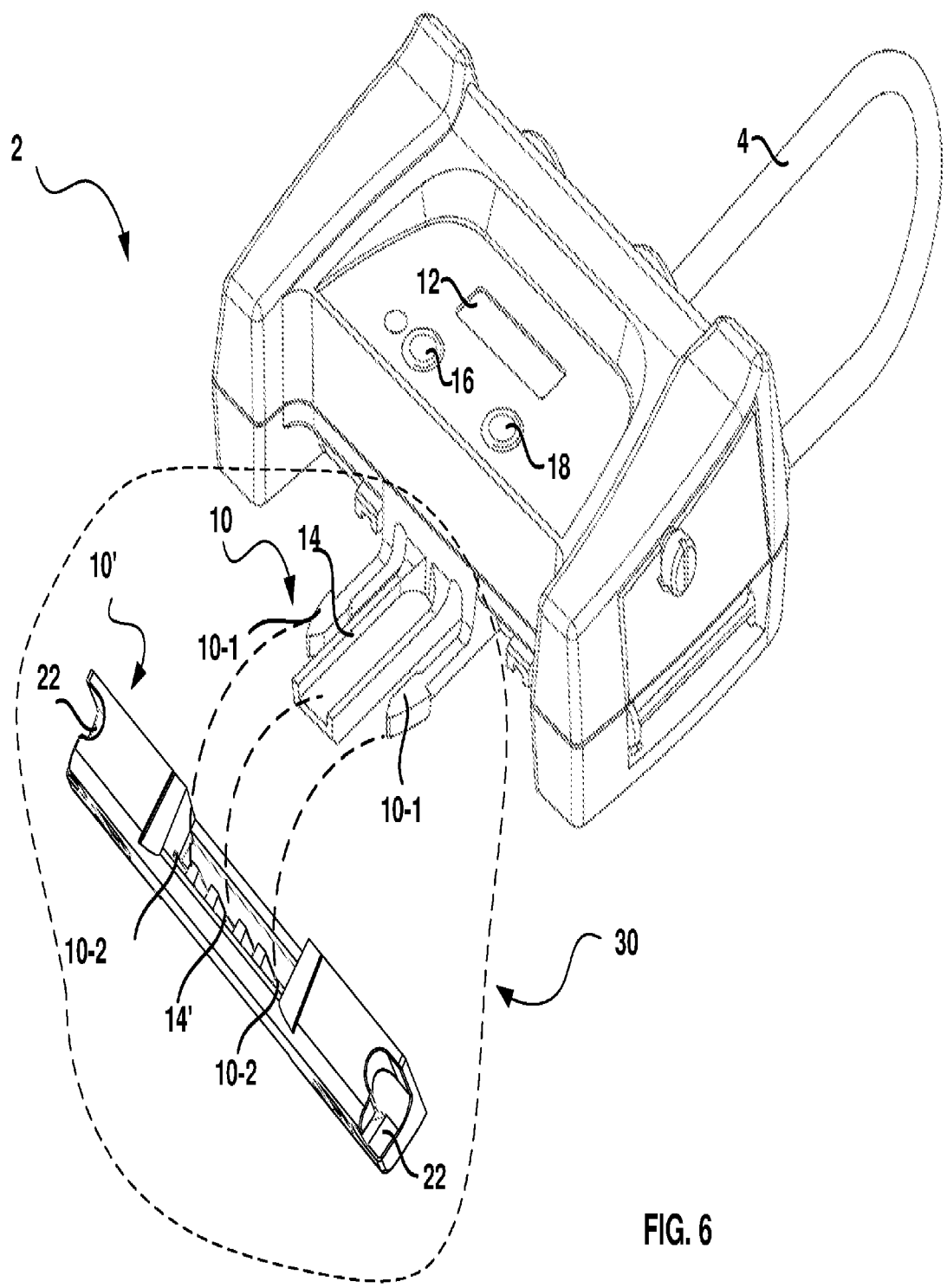
FIG. 6 is an isometric view of the exemplary communication gateway when detached from the NDT/NDI instrument in accordance with the present disclosure.

Reference is now made to FIG. 6, communication gateway 2 when detached from instrument 1 is depicted. As seen in FIG. 6, retention clasp 30 similar to those seen on school bags can be used to facilitate the purpose of easy removal yet stably attaching communication gateway 2 onto instrument 1. The example embodiment clasp 30 is comprised of a first part 10 and a second part 10'. The second part 10' can be interpreted as an adapter facilitating the attachment of communication gateway 2 to instrument 1. The first part 10 comprises a pair of anchor tongues 10-1. Correspondingly, the second part 10' comprises a pair of receiving slots 10-2, matching corresponding anchor tongues 10-1. A stabilizing bar 14, optionally configured near anchor tongues 10-1, is matched with a corresponding stabilizing slot 14' near receiving slots 10-2 on the second part 10'. The sizes and positions of receiving slots 10-2 and corresponding anchor tongues 10-1 are configured so that when the operator squeezes the two anchor tongues closer together, it allows the release of male part 10 from female part 10' conveniently without using any tools.

Figure 7:
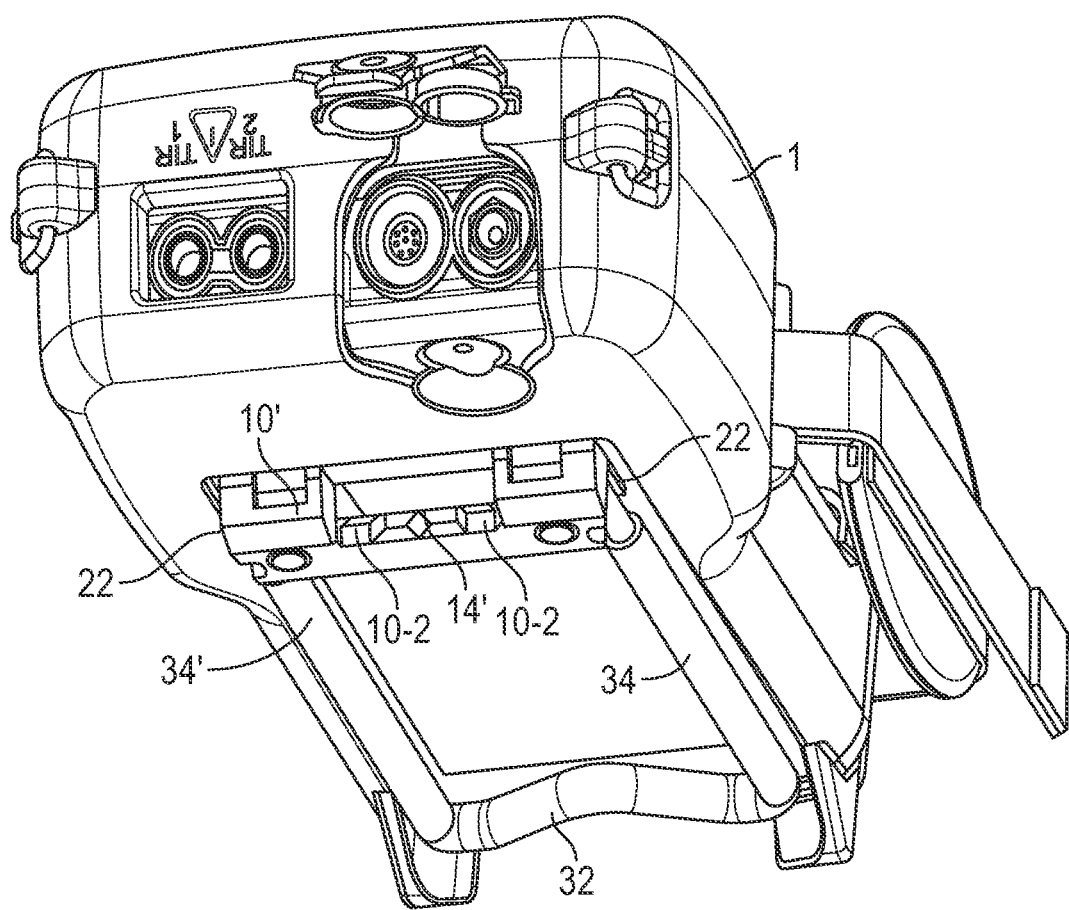
FIG. 7 is an isometric view of the instrument with a gateway attachment part (an adapter) attached, ready for the communication gateway to be clipped on according to one embodiment of the present disclosure.

FIG. 7 shows an embodiment of the second part 10' of clasp 30 being attached to instrument 1. Referring to FIGS. 6 and 7, existing instrument 1 in this exemplary embodiment comes with an existing stand 32 having a pair of retention stand arms 34 and 34'. The second part 10' of clasp 30 is preferably configured with a pair bolt holes 22 to receive and hold the ends of retention arms 34 and 34' of the existing instrument stand 32. This embodiment provides the advantage of retrofitting existing instrument 1 with a newly designed communication gateway without the need to change the design of the instrument 1.

Alternative designs allowing the communication gateway 2 to be removably secured or attached to instrument can be devised and are within the scope of the present disclosure. For example, a compression over-center latch, a buckle with the similar structure of seat-belt buckles, Velco® straps, etc. Alternatively, the communication gateway 2 may be secured permanently to the instrument 1. It can be appreciated by those skilled in the art that all such alternative embodiments are with the scope of the present disclosure.

Figure 8:
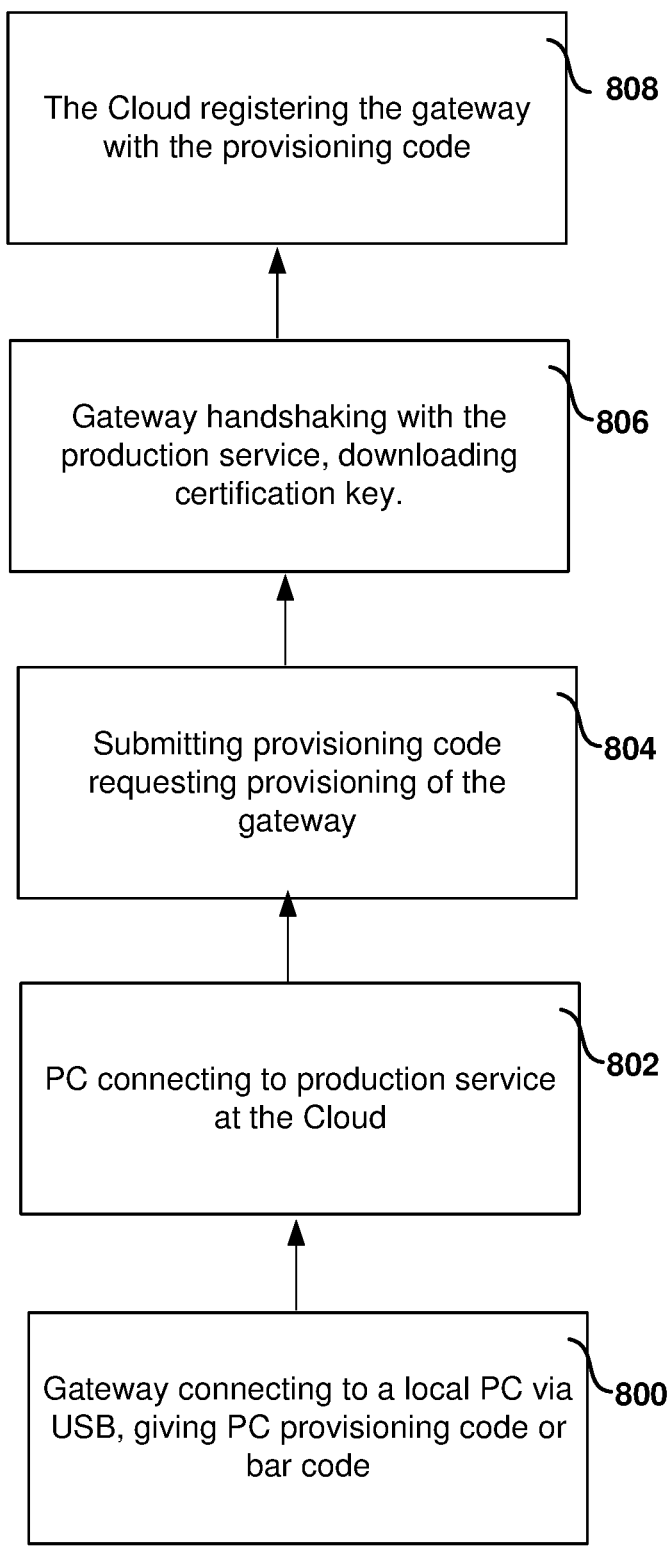
FIG. 8 is a flow diagram depicting an example embodiment method for certification or provisioning of the communication gateway with the external network (the Cloud).

FIG. 8 is a flow diagram showing the example embodiment communication gateway being certified as a Cloud recognized hardware. Without such certification, communication gateway 100 is not recognized by the Cloud. The certification process comprises the steps as follows. In step 800, communication gateway 2 is connected to a local service PC (not shown) via USB connector (host) 218 (in FIG. 3), giving PC a provisioning code or bar code. The local service PC can also be other type of device that is already connected to the Cloud. In step 802, the PC makes a connection to a certification service at the Cloud 100. In step 804, the PC make a request for certification of the gateway 2 and submitting the provisioning code. In step 806, gateway 2 conducts handshaking with the certification service at the Cloud, downloading a certification key and the production service at the Cloud 100 confirms the certification of gateway 2. In step 808, the Cloud 100 confirms the certification of the gateway 2 with an established identity as a communication hardware with the certification key.

It should be noted that the above certification process is different from making registration of a user or user profile for a specific session of communication with the Cloud 100. The certification process established an identity for the gateway 2 to be recognized by the Cloud 100, no matter what application, task or which user that the communication gateway 2 is associated with.

Various exemplary embodiments of the present invention have been described with reference to the preceding drawings only as exemplary embodiments and the scope of the invention is limited only by the claims. These exemplary embodiments are provided only for enabling those skilled in the art to better understand and then further implement the present invention and are not intended to limit the scope of the present invention in any manner.

Further, example embodiments of the present invention may be practiced according to the claims without some or all of the specific details of the described embodiments. Therefore, the invention encompasses numerous alternative, modified, and equivalent embodiments that may be conceived having a structure and method disclosed as herein and such alternative embodiments may be used without departing from the principles of and within the scope of the appended claims.

For the purpose of clarity, technical material that is known in the technical fields related to the invention has not been described in detail so that the invention is not unnecessarily obscured. Accordingly, the above embodiments of the present invention are to be considered as illustrative and not restrictive, and the invention is not to be limited to the details of the example embodiments given herein, but may be modified within the scope and equivalents of the appended claims.

What is claimed is:

1. A communication gateway configured to be physically attached to a non-destructive testing and inspection (NDT/NDI) instrument, the communication gateway comprising:
   a processor;
   a network interface;
   a memory storing computer readable code which, when executed on the processor, causes the processor to perform operations comprising:
      providing, via a computing device, an identifier associated with the communication gateway to a certification service to certify the gateway;
      performing handshaking with the certification service to obtain from the certification service a certification key based on the identifier associated with the communication gateway;
      receiving data from the NDT/NDI instrument;
      communicating, based on the certification key, the data received from the NDT/NDI instrument to an external network over the network interface;
      receiving an inspection plan from the external network at the communication gateway; and
      transferring the inspection plan from the communication gateway to the NDT/NDI instrument.

2. The communication gateway of claim 1, further comprising:
   a housing of the communication gateway configured to be physically attached with an attachment element to the NDT/NDI instrument; and
   an interconnect of the housing configured to be communicatively coupled with and to carry data between the NDT/NDI instrument and the communication gateway.

3. The communication gateway of claim 1, wherein providing the identifier comprises:
   providing a provisioning code or bar code to the computing device, the computing device forming a connection to the certification service over the Internet.

4. The communication gateway of claim 3, wherein the computing device requests certification of the gateway from the certification service using the provisioning code or bar code, the certification service confirming certification of the gateway as having an established communication hardware identity with the certification key.

5. The communication gateway of claim 1, wherein a housing of the communication gateway is physically and removably attached to a back portion of the NDT/NDI instrument, and wherein the data includes at least one of the following: ultrasonic A-scan data and an eddy current strip chart.

6. The communication gateway of claim 1, wherein the communication gateway is removably secured to the NDT/NDI instrument using an attachment element that comprises at least one of a clasp, a latch, a buckle, or a strap.

7. The communication gateway of claim 1, wherein the operations further comprise:
   establishing a data connection with the NDT/NDI instrument;
   establishing a communication channel with the external network; and
   sending the data to the external network.

8. The communication gateway of claim 1, wherein the communication gateway is removably secured to the NDT/NDI instrument using a clasp, wherein the clasp comprises a first part and a second part which are correspondingly to be affixed onto a housing and the NDT/NDI instrument, and the first part and the second part are configured to be attached to each other and to be detached from each other without need of using a tool.

9. A method comprising:
   providing, via a computing device, an identifier associated with a communication gateway to a certification service to certify the gateway;
   performing handshaking with the certification service to obtain from the certification service a certification key based on the identifier associated with the communication gateway;
   receiving data from an NDT/NDI instrument;
   communicating, based on the certification key, the data received from the NDT/NDI instrument to an external network over a network interface;
   receiving an inspection plan from the external network at the communication gateway; and
   transferring the inspection plan from the communication gateway to the NDT/NDI instrument.

10. The method of claim 9, wherein the communication gateway comprises:
   a housing configured to be physically attached with an attachment element to the NDT/NDI instrument, the housing comprising an interconnect configured to be communicatively coupled with and to carry data between the NDT/NDI instrument and the communication gateway.

11. The method of claim 9, wherein providing the identifier comprises:

providing a provisioning code or bar code to the computing device, the computing device forming a connection to the certification service over the Internet.

12. The method of claim 11, wherein the computing device requests certification of the gateway from the certification service using the provisioning code or bar code, the certification service confirming certification of the gateway as having an established communication hardware identity with the certification key.

13. The method of claim 9, wherein a housing of the communication gateway is physically and removably attached to a back portion of the NDT/NDI instrument, and wherein the data includes at least one of the following: ultrasonic A-scan data and an eddy current strip chart.

14. The method of claim 9, wherein the communication gateway is removably secured to the NDT/NDI instrument using an attachment element that comprises at least one of a clasp, a latch, a buckle, or a strap.

15. The method of claim 9, further comprising:
establishing a data connection with the NDT/NDI instrument;
establishing a communication channel with the external network; and
sending the data to the external network.

16. The method of claim 9, wherein the communication gateway is removably secured to the NDT/NDI instrument using a clasp, wherein the clasp comprises a first part and a second part which are correspondingly to be affixed onto a housing and the NDT/NDI instrument, and the first part and the second part are configured to be attached to each other and to be detached from each other without need of using a tool.

17. A non-transitory computer readable storage medium comprising executable instructions which, when executed by a processor, cause the processor to perform operations comprising:

providing an identifier associated with a communication gateway to a certification service to certify the communication gateway;
performing handshaking with the certification service to obtain from the certification service a certification key based on the identifier associated with the communication gateway;
receiving data from an NDT/NDI instrument;
communicating, based on the certification key, the data received from the NDT/NDI instrument to an external network over a network interface;
receiving an inspection plan from the external network at the communication gateway; and
transferring the inspection plan from the communication gateway to the NDT/NDI instrument.

18. The non-transitory computer readable storage medium of claim 17, wherein the communication gateway comprises:
a housing configured to be physically attached with an attachment element to the NDT/NDI instrument, the housing comprising an interconnect configured to be communicatively coupled with and to carry data between the NDT/NDI instrument and the communication gateway.

19. The non-transitory computer readable storage medium of claim 17, wherein the operations comprise providing a provisioning code or bar code to the computing device, the computing device forming a connection to the certification service over the Internet.

20. The non-transitory computer readable storage medium of claim 17, wherein the communication gateway is removably secured to the NDT/NDI instrument using an attachment element that comprises at least one of a clasp, a latch, a buckle, or a strap.

* * * * *